US012641118B2

(12) United States Patent　　　　(10) Patent No.:　US 12,641,118 B2

Brandel et al.　　　　　　　　　　　(45) Date of Patent:　　May 26, 2026

(54) PERFORMING AUTOMATED DETECTION OF PHISHING WEB SITES USING EMBEDDED TRACKING ELEMENT

(71) Applicant: Target Brands, Inc., Minneapolis, MN (US)

(72) Inventors: Eric Robert Brandel, Minnetonka, MN (US); Daniel Christopher J. Flettre, St. Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 186 days.

(21) Appl. No.: 18/425,212

(22) Filed: Jan. 29, 2024

(65) Prior Publication Data

US 2025/0247423 A1　　Jul. 31, 2025

(51) Int. Cl.
H04L 9/40　　　　　(2022.01)
(52) U.S. Cl.
CPC ................................ H04L 63/1483 (2013.01)
(58) Field of Classification Search
CPC .................................................. H04L 63/1483
See application file for complete search history.

(56) References Cited

U.S. PATENT DOCUMENTS

| | | | |
|---|---|---|---|
| 6,401,118 B1 | 6/2002 | Thomas | |
| 8,291,065 B2 * | 10/2012 | Goodman | ........... H04L 63/1483 |
| | | | 709/224 |
| 8,381,292 B1 | 2/2013 | Warner et al. | |

| | | | |
|---|---|---|---|
| 8,695,091 B2 * | 4/2014 | Komili | .................... H04L 63/20 |
| | | | 726/24 |
| 8,839,418 B2 | 9/2014 | Hulten et al. | |
| 9,065,850 B1 * | 6/2015 | Sobrier | ............... H04L 63/1483 |
| 9,111,090 B2 * | 8/2015 | Klein | .................... G06F 21/552 |
| 9,411,785 B1 * | 8/2016 | Wong | .................... G06F 40/126 |
| 10,511,628 B1 * | 12/2019 | Richards | ............. G06F 16/9566 |
| 11,109,197 B2 * | 8/2021 | Lamb | .................. H04L 63/0485 |

(Continued)

FOREIGN PATENT DOCUMENTS

WO　　WO-2025115017 A1 *　6/2025　......... H04L 63/1483

OTHER PUBLICATIONS

Sergei Bachinin, What is base64 Encoding andWhy is it Necessary?, Nov. 28, 2023, https://www.freecodecamp.org/news/what-is-base64-encoding/ (Year: 2023).*

(Continued)

*Primary Examiner* — Khang Do
(74) *Attorney, Agent, or Firm* — Barnes & Thornburg LLP

(57)　　　　　　　ABSTRACT

In some implementations, a method performed by data processing apparatuses includes serving a web page comprising an embedded markup image and a detection script. The detection script is configured to cause a client device to, in response to loading the embedded markup image, determine a current environment location indicative of a source of the web page, determine whether the current environment location matches a domain associated with a subject system, generate an obfuscated data payload based on the current environment location, and send a request to a predetermined endpoint in response to determining that the current environment location does not match the domain associated with the subject system. The request includes the obfuscated data payload.

20 Claims, 7 Drawing Sheets

(56) References Cited

U.S. PATENT DOCUMENTS

| | | | | |
|---|---|---|---|---|
| 11,356,481 | B1 * | 6/2022 | Singh | H04L 63/1483 |
| 11,444,978 | B1 * | 9/2022 | Liao | G06N 3/04 |
| 11,470,114 | B2 * | 10/2022 | Pratt | H04L 63/1416 |
| 11,561,988 | B2 | 1/2023 | Jenkins | |
| 12,021,894 | B2 * | 6/2024 | Clausen | H04L 63/1416 |
| 12,231,464 | B2 * | 2/2025 | Azarafrooz | H04L 63/1483 |
| 12,294,611 | B2 * | 5/2025 | Maha | H04L 67/02 |
| 2004/0202327 | A1 * | 10/2004 | Little | H04W 12/033 |
| | | | | 380/270 |
| 2007/0039038 | A1 * | 2/2007 | Goodman | H04L 63/1483 |
| | | | | 726/2 |
| 2008/0040503 | A1 * | 2/2008 | Kleks | H04L 67/06 |
| | | | | 709/236 |
| 2008/0092242 | A1 * | 4/2008 | Rowley | H04L 63/1483 |
| | | | | 726/27 |
| 2008/0244715 | A1 * | 10/2008 | Pedone | H04L 63/1441 |
| | | | | 726/5 |
| 2010/0205297 | A1 * | 8/2010 | Sarathy | H04L 63/0407 |
| | | | | 709/224 |
| 2010/0325107 | A1 | 12/2010 | Kenton et al. | |
| 2011/0196864 | A1 * | 8/2011 | Mason | G06F 3/0488 |
| | | | | 707/E17.014 |
| 2013/0263264 | A1 * | 10/2013 | Klein | G06F 21/554 |
| | | | | 726/23 |
| 2014/0172495 | A1 | 6/2014 | Schneck et al. | |
| 2014/0358888 | A1 | 12/2014 | Whitelaw et al. | |
| 2016/0055490 | A1 | 2/2016 | Keren et al. | |
| 2016/0253679 | A1 | 9/2016 | Venkataraman et al. | |
| 2016/0352805 | A1 | 12/2016 | Seida | |
| 2018/0338283 | A1 * | 11/2018 | Karsi | H04L 5/0044 |
| 2019/0268373 | A1 * | 8/2019 | Celik | G06V 30/418 |
| 2020/0286015 | A1 * | 9/2020 | Richards | H04L 61/4511 |
| 2020/0287934 | A1 * | 9/2020 | Richards | G06F 21/554 |
| 2021/0117544 | A1 * | 4/2021 | Kurtz | G06F 21/566 |
| 2021/0203691 | A1 * | 7/2021 | Pratt | H04L 63/1416 |
| 2021/0203693 | A1 * | 7/2021 | Clausen | H04L 63/1425 |
| 2022/0188699 | A1 * | 6/2022 | Matlick | G06F 21/6254 |
| 2023/0065787 | A1 * | 3/2023 | Akhter | G06F 21/566 |
| 2023/0231879 | A1 * | 7/2023 | Li | H04L 63/1416 |
| | | | | 726/22 |
| 2023/0247050 | A1 * | 8/2023 | Seletskiy | H04L 63/1433 |
| | | | | 726/22 |
| 2023/0262078 | A1 * | 8/2023 | Rozhnov | H04L 63/1425 |
| | | | | 726/1 |
| 2024/0114053 | A1 * | 4/2024 | Katz | H04L 63/1483 |
| 2024/0193282 | A1 * | 6/2024 | Townsend | G06F 21/602 |
| 2024/0205194 | A1 * | 6/2024 | Low | H04L 61/4511 |
| 2024/0314152 | A1 * | 9/2024 | Mistry | H04L 63/1408 |
| 2024/0388443 | A1 * | 11/2024 | Zemla | H04L 9/0891 |
| 2025/0168087 | A1 * | 5/2025 | Mauhourat | H04L 41/5074 |
| 2025/0247423 | A1 * | 7/2025 | Brandel | H04L 63/1483 |

OTHER PUBLICATIONS

Gamal et al., convert String to ASCII and ASCII to String, Apr. 22, 2015, https://stackoverflow.com/questions/29809923/convert-string-to-ascii-and-ascii-to-string (Year: 2015).*

* cited by examiner

*300*

Load Web Page Including Markup and Embedded Images          *302*

Load Embedded Markup-Based Image          *304*

Execute Script Associated With Markup-Based Image          *306*

Script Loads Data Attribute Stored in Embedded Markup-Based Image          *308*

Script Decodes Data Attribute Into Detection Script          *310*

Execute Detection Script          *312*

500

Monitor for Requests to
Predetermined Endpoint    502

Request?
504

No

Yes

Decode Obfuscated Data Payload to
Recover Source URL    506

Add Source URL as Potential
Phishing Source    508

Perform Source Investigation    510

PERFORMING AUTOMATED DETECTION OF PHISHING WEB SITES USING EMBEDDED TRACKING ELEMENT

TECHNICAL FIELD

This specification generally relates to techniques for detection of phishing websites and a platform for discovering and investigating potential sources of phishing attempts.

BACKGROUND

Phishing is practice in which a malicious actor attempts to deceive users into revealing sensitive information through deceptive practices. The malicious actor can generate online content that purports to be from a legitimate source, but is instead under the control of the malicious actor and is designed to harvest the users' sensitive information. Phishing sites may include content that has been directly copied from the website of the legitimate source. Technical approaches to prevent phishing attempts can include content-based analysis, applying content filters, and maintaining lists of known phishing sites.

SUMMARY

This document generally describes computer systems, processes, program products, and devices for detection of phishing websites. In general, the Internet can provide a large attack surface area, including a vast and ever-changing pool of potential malicious actors and potential sources of phishing attempts. Tracking and dealing with such potential threats in a proactive (rather than a reactive) manner can be logistically and technically challenging. The presently described technology attempts to detect and mitigate the threats before users are impacted, in such a way that is automated and intelligent.

Briefly, the technology described in this document involves embedding a tracking element into a web page served by a subject system that is associated with a particular host domain, URL, or IP address. The tracking element determines if the current environment location of the web page (e.g., host domain, URL, IP address) is associated with the subject system and, if not, notifies a phishing identification system with that current environment location as a potential phishing source. Accordingly, if part or all of the web page, including the tracking element, is subsequently copied by a malicious actor and served to a user from a different server system as part of a broader phishing attempt with regard to the subject system, then the phishing identification system is notified of the address of the phishing website when the tracking element is executed/interpreted by a client device loading the copied web page and tracking element from the different server system.

The disclosed technology can be configured such that the tracking element, the operations that it performs on a client device to identify likely instances of phishing, and the network communication that it transmits to the phishing identification are obfuscated and difficult for malicious actors to detect or silence. For example, the tracking element can appear to be the same as or similar to many other web elements that are part of a web page, and can include a script or other code with operations that are obfuscated to a viewer (i.e., not readily detectable or identifiable by a user viewing the tracking element code) but which perform the phishing detection operations. For instance, the tracking element code may be encoded in various formats that are configurable to be executed by the client device, but which are not readily interpretable when viewed outside of execution. In another example, the tracking element code may be configured to write and generate additional code portions once interpreted that perform the phishing detection operations, and/or to access/download additional code portions to accomplish the same. Similarly, the communication regarding the phishing detection that is performed by the client device to the phishing identification system can additionally be encoded or otherwise secured from ready viewing/detection, and the phishing identification system to which the communication is channeled can be distinct from and unassociated with the subject system against which the phishing attempt is being performed (e.g., different domain or URL from the subject system).

In response to the identification of a likely source of an actual phishing attempt, appropriate alerts can be triggered, and appropriate mitigation actions can be performed. User interfaces can be provided to configure the automated discovery and monitoring operations, to configure the rules and alerts, and to facilitate the performance of the mitigation actions. After performing a mitigation action, the source of an actual phishing attempt can continue to be monitored at an appropriate frequency, to verify the performance of the action. By mitigating the sources of actual phishing in a timely manner, for example, sensitive user information can be effectively protected.

In some implementations, a method performed by data processing apparatuses includes serving a web page comprising an embedded markup image and a detection script. The detection script is configured to cause a client device to, in response to loading the embedded markup image, determine a current environment location indicative of a source of the web page, determine whether the current environment location matches a domain associated with a subject system, generate an obfuscated data payload based on the current environment location, and send a request to a predetermined endpoint in response to determining that the current environment location does not match the domain associated with the subject system. The request includes the obfuscated data payload.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The embedded markup image may include a scalable vector graphics image. The web page may further include a first script associated with the embedded markup image. The first script is configured to cause the client device to, in response to loading the embedded markup image, decode a first data attribute in the embedded markup image to recover the detection script, and execute the detection script in response to decoding of the first data attribute. The first data attribute may represent a plurality of numeric values, and wherein to decode the first data attribute may include to convert the plurality of numeric values represented by the first data attribute into a plurality of characters indicative of the detection script. To convert the plurality of numeric values may include to convert the numeric values with an ASCII encoding. The current environment location may include a window location uniform resource locator (URL), and wherein to determine whether the current environment location matches the domain associated with the subject system may include to determine whether the window location URL matches a top-level domain associated with the subject system. To generate the obfuscated data payload may include to generate a base64-encoded string indicative of the current environment location. To send the request to the predetermined endpoint may include to send a hypertext transfer protocol request that comprises the obfuscated data payload to the predetermined endpoint. The predetermined endpoint may include an obfuscated website address. To send the request may include to send one or more DNS requests to the predetermined endpoint, wherein the one or more DNS requests comprises the obfuscated data payload. The method may further include receiving, by the predetermined endpoint, the request from the client device, decoding, by the predetermined endpoint, the obfuscated data payload of the request to recover the current environment location, and adding, by the predetermined endpoint, the current environment location to a database of potential phishing sources.

The systems, devices, program products, and processes described throughout this document can, in some instances, provide one or more of the following advantages. In particular, the techniques described herein may provide improved phishing detection compared to current technologies. In particular, phishing attempts can be automatically detected in real time as the phishing attempt is experienced by users, without requiring manual notification by users or administrators. Additionally, features of the tracking element, including structure, location, and obfuscation, encourage malicious actors to include the tracking element when copying web content to generate a phishing web site. Further, obfuscation features of the tracking element also prevent malicious actors from detecting the tracking behavior performed by the tracking element, which helps ensure that the tracking element remains included in phishing web pages.

Other features, aspects and potential advantages will be apparent from the accompanying description and figures.

DESCRIPTION OF DRAWINGS

Like reference symbols in the various drawings indicate like elements

DETAILED DESCRIPTION

This document describes technology that can automatically detect potential phishing web sites. Briefly, a subject system (such as a web server) serves web content that includes an embedded tracking element. The embedded tracking element automatically detects if the web content (including the embedded tracking element) may have been included in phishing web content. Automated detection of potential phishing sites may be integrated with other systems and techniques for discovering potential sources of phishing attempts, performing automated digital investigations of the discovered sources, and performing mitigation actions to prevent phishing occurrences.

Figure 1:
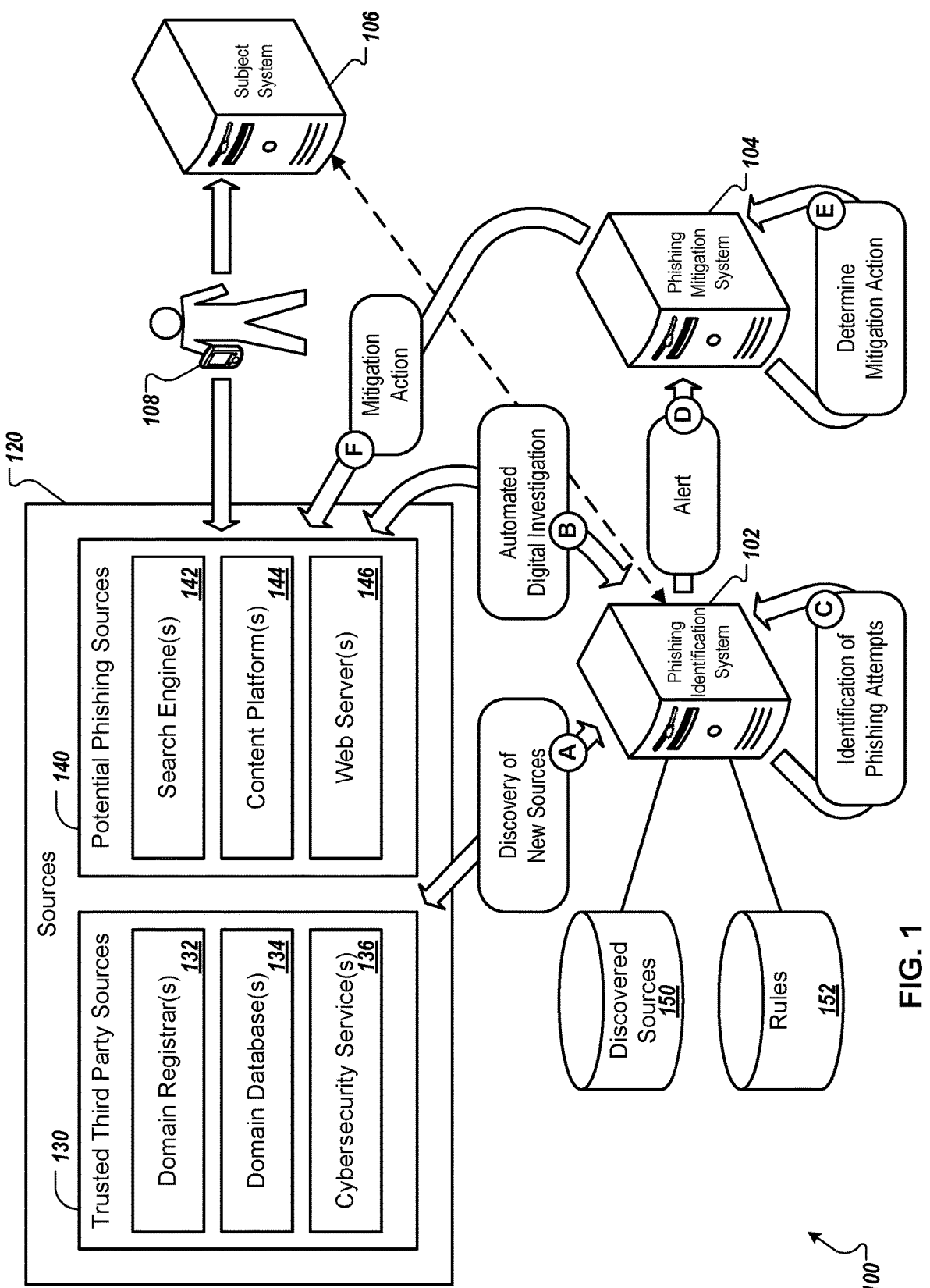
FIG. 1 depicts an example system for discovering potential sources of phishing attempts, performing automated digital investigations, and performing mitigation actions.

FIG. 1 depicts an example system 100 for discovering potential sources of phishing attempts, performing automated digital investigations, and performing mitigation actions, as represented in example stages (A) to (F). Stages (A) to (F) may occur in the illustrated sequence, or they may occur in a sequence that is different than in the illustrated sequence, and/or two or more stages (A) to (F) may be concurrent. In some examples, one or more stages (A) to (F) may be repeated multiple times when identifying, investigating, and/or mitigating phishing attempts.

The system 100 can include a phishing identification system 102, a phishing mitigation system 104, and a subject system 106. Each of the systems 102, 104, 106, for example, can include one or more computing servers and one or more data sources. In some examples, multiple of the systems 102, 104, 106 can be combined into a single system, and/or any of the systems can be partitioned into two or more separate systems. In some examples, the computing servers can include various forms of servers, including but not limited to network servers, web servers, application servers, or other suitable computing servers. In some examples, the data sources can include databases, file systems, and/or cached data sources. The computing servers, for example, can access data from the data sources, can execute software that processes the accessed data, and can provide information based on the accessed/processed data to client devices that can be operated by users. Communication between the computing servers, the data sources, and the client devices, for example, can occur over one or more communication networks, including a LAN (local area network), a WAN (wide area network), and/or the Internet.

The phishing identification system 102, for example, can perform operations to discover potential sources of phishing attempts and to investigate the discovered sources. To perform the operations, for example, the phishing identification system 102 can access data from various web-based sources 120, including trusted third party sources 130 and potential phishing sources 140. In general, the sources 120 can include web servers that provide resources (e.g., web pages, applications, documents, content items such as graphics, audio, audiovisual media, etc., and other resources) in response to data requests (URIs (Uniform Resource Identifiers), URLs (Uniform Resource Locators), etc.). The trusted third party sources 130, for example, can include domain registrars 132, domain databases 134, cybersecurity services 136, and possible other sources. The potential phishing sources 140, for example, can include search engines 142, content platforms 144, web servers 146, and other possible sources. Although the trusted third party sources 130 do not generally include the potential phishing sources 140, the trusted third party sources 130 can be leveraged while discovering new potential sources of phishing attempts.

The phishing mitigation system 104, for example, can perform operations to determine appropriate mitigation actions in response to an identified phishing attempt, and to facilitate performance of the mitigation actions. Mitigation actions, for example, can include taking down a website, blocking content provided by a website, notifying system users about phishing attempts from websites, or other appropriate actions. In the present example, the phishing mitigation system 104 can be in communication with the phishing identification system 102, and any of the sources 120.

The subject system 106, for example, can be operated and maintained by an organization, and can be the target of phishing attempts. For example, the subject system 106 can include one or more websites of the organization, which can provide access to the organization's data through various portals (e.g., customer portals, vendor portals, employee portals, etc.). In the present example, a user can employ a computing device 108 (e.g., a stationary or mobile processing device including, but not limited to a desktop computer, a laptop computer, a tablet computer, a personal digital assistant (PDA), a smartphone, or another processing device) to access the subject system 106 (e.g., the organization's website) and to access any of the sources 120. A malicious actor can generate web-based resources that purport to be affiliated with the organization that is responsible for the subject system 106, for example, with the intent of deceiving the user of the computing device 108 for the purpose of harvesting the user's information (e.g., login credentials, account information, or other private information). The maliciously generated web-based resources (e.g., phishing attempts), for example, can be surfaced to the user through the search engine(s) 142, the content platform(s) 144, and/or other web server(s) 146.

Preventing phishing attempts by malicious actors can be challenging from a technical and a logistical standpoint, since the number of resources available on the web is vast, and the resources are constantly changing (e.g., with new web domains being created, existing domains being removed, and resources available from the domains being added, removed, and modified). To solve the technical problem of preventing phishing attempts across a vast and ever changing landscape, for example, the system 100 can automatically perform operations to discover potential sources of phishing attempts, to monitor the potential sources over time, to identify actual phishing attempts, and to determine and perform mitigation actions in response to the identification of the actual phishing attempts. Such automated operations, for example, can server to protect the data of the subject system 106 and the computing device 108 from malicious actors.

During stage (A), new sources can be discovered. For example, the phishing identification system 102 can access the sources 120 (e.g., including the trusted third party sources 130 and the potential phishing sources 140) to discover new potential sources of phishing attempts. In some implementations, multiple different source discovery techniques can be employed. The multiple different discovery techniques, for example, can each be independently executed according to its own schedule (e.g., once per day, twice per day, once every four hours, once per hour, once every five minutes, or at another appropriate interval), with data pertaining to the discovered sources being stored in a same data repository (e.g., a discovered sources data repository 150) for later digital investigation.

Figure 2:
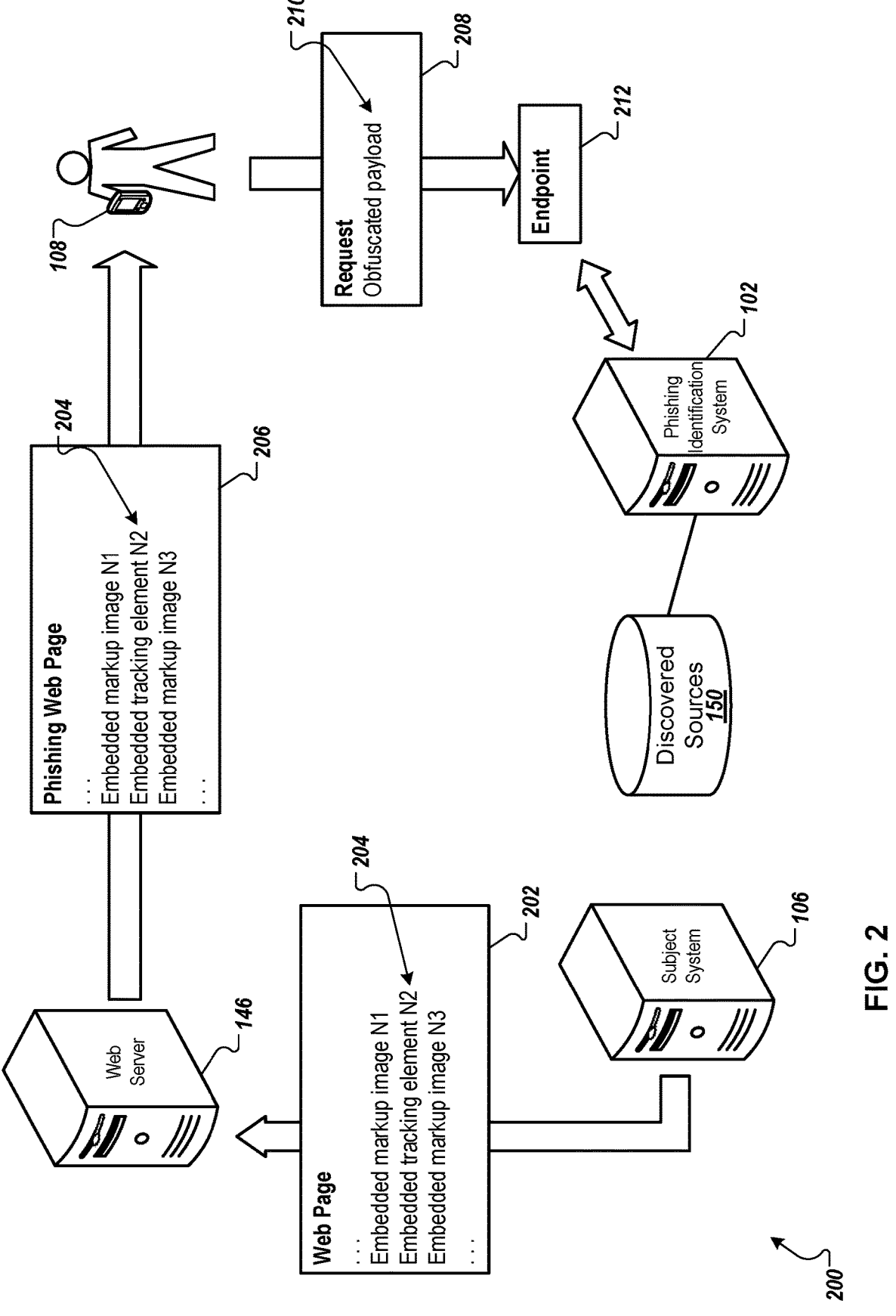
FIG. 2 depicts example techniques for automatically detecting phishing web site.

Referring now to FIG. 2, an example technique 200 for automatically detecting phishing web sites is depicted. In the illustrated technique 200, the subject system 106 serves a web page 202 or other web content. The web page 202 may be a sensitive web page that is designed to collect user information (e.g., login credentials, account information, or other private information). Additionally or alternatively, the web page 202 may be a public web page such as a store page, an e-commerce site, or other public page. As shown, the web page 202 includes embedded markup and/or styles including multiple embedded markup images N1, N2, N3, . . . , which may be embodied as scalable vector graphics (SVG) images or other markup-based embedded images included within the web page 202. One or more of the embedded markup images is an embedded tracking element 204 (in the illustrative embodiment, tracking element N2). The tracking element 204 may be included in the web page 202 in proximity (either in code and/or in presentation) to other embedded markup images (illustratively images N1, N3). Additionally, the tracking element 204 may be obfuscated in order to avoid detection by the malicious actor, as described further below. For example, the tracking element 204 may include obfuscated code (e.g., JavaScript) that appears to be related to the normal look and feel of the sensitive web page 202 (e.g., providing graphic display functionality, etc.). Additionally, the tracking element 204 may include one or more obfuscated data attributes that may include a detection script as described further below A malicious actor may copy part or all of the web page 202 served by the subject system 106. The malicious actor may modify the copied portion and host the modified portion on a domain that is under the control of the malicious actor, which is illustrated in FIG. 2 as the web server 146. As shown, the malicious web server 146 may serve a phishing web page 206 that includes the embedded markup images N1, N3 and the embedded tracking element 204 that were copied from the legitimate web page 202. As described above, the elements N1, N2, N3 are all in proximity to each other in the web page 202, and thus it is likely that a malicious actor (even a relatively sophisticated actor) may copy all of the elements N1, N2, N3 into the phishing web page 206, including the tracking element 204.

In use, a user device 108 may download the phishing web page 206 from the web server 146. The user device 108 executes one or more scripts associated with the embedded tracking element 204. Those scripts, which may be obfuscated to avoid detection by the malicious actor as described further below, determine whether the current environment location of the phishing web page 206 (i.e., a web address associated with the web server 146) matches a predetermined domain associated with the subject system 106 (e.g., a top-level domain or other trusted domain associated with the subject system 106). If not, the user device 108 sends a request 208 to a predetermined endpoint 212. The request 208 includes an obfuscated payload 210 that identifies the web server 146. The phishing identification system 102 receives notifications via the endpoint 212 when a request 208 is received. Based on the received request 208, the phishing identification system 102 may add the web server 146 to the discovered sources 150 or otherwise perform phishing detection and/or mitigation.

Accordingly, the system 100 provides for automated detection and/or notification of phishing attempts. As described above, when copying/modifying the sensitive web page 202, for example, the malicious actor will likely fail to remove the obfuscated code associated with the tracking element 204 (as it appears to be related to normal operations of the page), and this obfuscated code will thus be executed by a user's computing device (e.g., computing device 108) when the phishing web page 206 is presented, thereby alerting the phishing identification system 102 to a potential phishing attempt. Further, since the obfuscated code does not get executed until it is at the user's computing device 108, the true purpose of the code may be difficult for the malicious actor to discern. In the present example, multiple different tracked page notifications (e.g., "TrackedPageA," "TrackedPageB," etc., and "TrackedPageN") may be received by the phishing identification system 102. The notifications, for example, may originate from various computing devices (e.g., multiple computing devices 108) that receive and present tracked pages 206 from the websites of malicious actors (e.g., part or all of sensitive web pages 202 that have been copied from the subject system 106 by the malicious actors and that include tracking components 204). For example, the computing device 108 can execute code of the tracking component 204 of the tracked page 206, which causes the computing device 108 to generate and send a request/notification that includes the tracked page's web address. Upon receipt by the phishing identification system 102, for example, the web addresses of the tracked pages 206 associated with the tracked page notifications can be provided to the discovered sources data repository 150, where the data can be stored for subsequent automated digital investigation.

Referring again to FIG. 1, for example, after the phishing identification system 102 has been notified of a potential phishing source (e.g., during stage (A)), subsequent stages can include performing an automated digital investigation of the potential phishing source (e.g., during stage (B)). If a phishing attempt is identified (e.g., stage (C)) from the automated digital investigation, for example, an alert can be generated (e.g., stage (D)), a mitigation action can be determined (e.g., stage (E)), and the mitigation action can be performed (e.g., stage (F)). The discovery of new potential phishing sources (e.g., stage (A)) can be performed using various different techniques according to various different schedules, and can be performed independently of and concurrently with stages (B)-(F), which can generally be separately performed for each previously identified potential phishing source.

Figure 3:
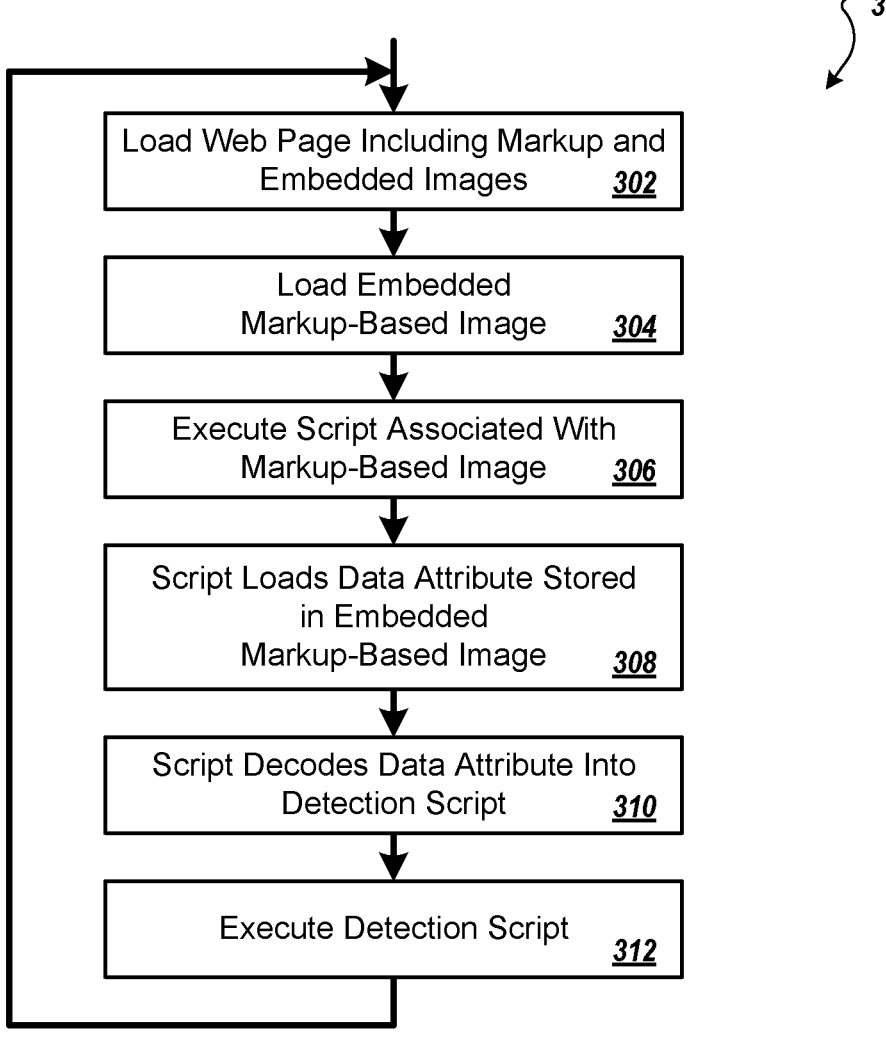
FIG. 3 is a flow diagram of an example technique for automatically detecting a phishing website that may be executed by a user computing device.

Referring now to FIG. 3, a flow diagram of an example method 300 is shown for automatically detecting potential phishing web sites. In the present example, the method 300 can be performed by components of the system 100 such as a user device 108, and will be described with reference to FIG. 1. However, other systems may be used to perform the same or a similar process.

At 302, a user device 108 (e.g., a smartphone, laptop computer, desktop computer, or other device used by an end user) loads a web page 202, 206 including markup and embedded images. As described above, the user device 108 may load a web page 202 from a subject system 106 or a web page 206 from a web server 146, which may be controlled by a malicious actor. Accordingly, either of the web pages 202, 206 includes an embedded tracking element 204.

At 304, the device 108 loads an embedded markup-based image from the web page 202, 206. The embedded markup-based image includes and/or is a component of the embedded tracking element 204. Illustratively, the embedded markup-based image is a scalable vector graphics (SVG) image, although in other embodiments the embedded markup-based image may be any scriptable image format, and in particular may be any scriptable image format that is widely supported by web browsers and in common use across ordinary websites. The embedded markup-based image is obfuscated, for example by including source code and/or presentation that appears to be related to the visual representation and/or functionality of the legitimate web page 202. For example, the embedded markup-based image may share a naming convention, a code style, a structure, a source address, or other characteristics with other embedded markup-based images used in the legitimate web page 202. In an embodiment, the embedded markup-based image may render as a transparent pixel, a background pixel, or otherwise render invisibly. In another embodiment, the embedded markup-based image may render as a border, a background, a navigation element, or other common visual element of a website.

At 306, the device 108 executes a script associated with the embedded markup-based image. For example, the device 108 may execute JavaScript or other script code in response to loading the SVG element associated with the embedded markup-based image. At 308, the script executed by the device 108 loads a data attribute stored in the markup-based image. The contents and/or metadata associated with the data attribute are obfuscated. For example, the data attribute may have a name or other metadata that appears to be related to images or other visual presentation of the web page 202 (e.g. "animation-path" or similar). Illustratively, the data attribute may be embodied as an XML/HTML attribute associated with a tag of the SVG element; however, in other embodiments, the data attribute may be included in any appropriate format. The contents of the data attribute may also be encoded or otherwise scrambled.

At 310, the script executed by the device 108 decodes the content of the data attribute to recover a detection script. In an illustrative embodiment, the data attribute may include the contents of the detection script encoded as numeric ASCII values. For example, the character 'A' may be represented in the data attribute as decimal numeral "65," the character 'B' may be represented in the data attribute as decimal numeral "66," and so on. The script associated with the SVG element may use a non-obvious algorithm to decode the data attribute, in order to further obfuscate the embedded tracking element 204.

At 312, the device 108 executes the detection script recovered from the data attribute. The detection script determines whether the embedded tracking element 204 has been loaded from a web server 146 or other location associated with the subject system and, if not, reports the address of that web server 146 to the phishing identification system 102. One potential embodiment of techniques for executing the detection script is described below in connection with FIG. 4. After executing the detection script, the method 300 loops back to block 302, in which the device 108 may continue to load web pages 202, 206 that may include an embedded tracking element 204.

Figure 4:
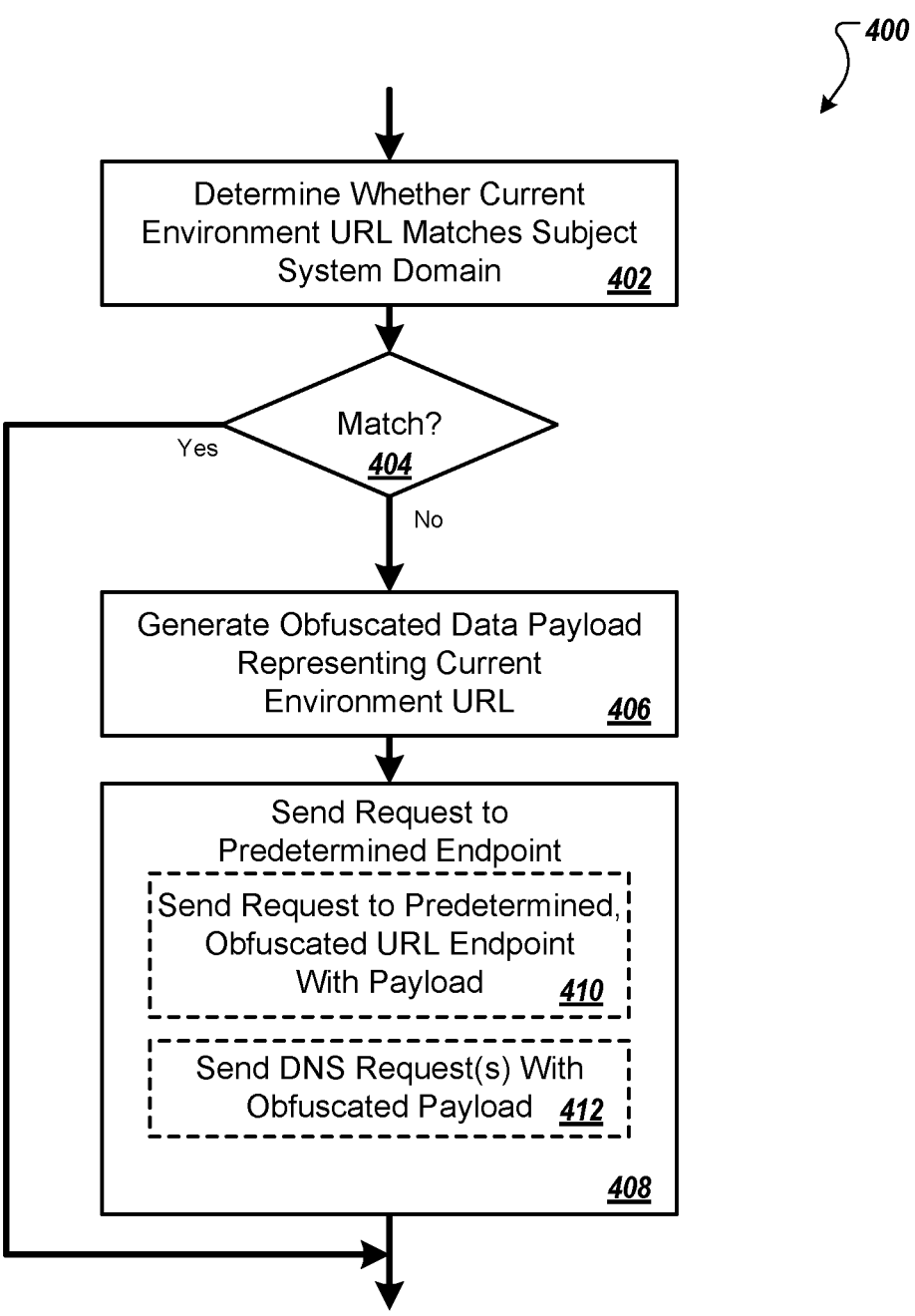
FIG. 4 is a flow diagram of an example technique for executing a detection script that may be executed in connection with the technique of FIG. 3.

Referring now to FIG. 4, a flow diagram of an example method 400 is shown for executing a detection script as described above. In the present example, the method 400 can be performed by components of the system 100 such as a user device 108, and will be described with reference to FIG. 1. However, other systems may be used to perform the same or a similar process.

At 402, the detection script executed by the device 108 determines whether a current environment uniform resource locator (URL) matches a subject system 106 domain. To determine the current environment URL, the detection script may interrogate one or more objects provided by a web browser or other scripting environment of the device 108, such as the window.location object provided by most web browsers. The detection script may determine whether one or more host names, domain names, top-level domains, or other parts of the current environment URL matches a domain name associated with the subject system 106. For example, the detection script may determine whether the current environment URL is included within a hierarchy rooted by a top-level domain or other domain associated with the subject system 106. As another example, the detection script may determine whether the current environment URL exactly matches a domain name associated with the subject system 106. Additionally or alternatively, the detection script may use any other appropriate technique to determine whether the current environment URL matches the subject system 106. Similarly, although described as a current environment URL, it should be understood that in some embodiments the detection script may identify one or more IP addresses, uniform resource indicators (URIs), and/or other addresses associated with the source of the web page that includes the embedded tracking element 204.

At 404, the detection script executed by the device 108 checks whether the current environment URL matches the subject system 106 domain. If so, the method 400 is completed. Accordingly, when loading a legitimate web page 202 hosted by the subject system 106 (or from another server with an appropriately matching URL, such as a host name associated with a first-party web server of the subject system 106), the device 108 does not generate a notification of a potential phishing attempt. Referring again to block 404, if the current environment URL does not match the subject system 106, the method 400 advances to block 406.

At 406, the detection script generates an obfuscated data payload 210 that represents the current environment URL. For example, the detection script may generate a base64 encoded version of the current environment URL. Of course, in other embodiments the detection script may use any other appropriate encoding scheme to generate the obfuscated data payload 210.

At 408, the detection script sends a request 208 to the predetermined endpoint 212. The request 208 includes or is otherwise indicative of the obfuscated data payload 210. At 410, in some embodiments, the detection script may send the request 208 to a predetermined, obfuscated URL endpoint with the obfuscated data payload 210. For example, the detection script may send the request 208 as a HTTP GET request, an HTTP POST request, a similar HTTPS request, or other web request. The domain name and/or address of the predetermined endpoint 212 may be similar to other requests used by the subject system 106, and thus may not be easily detected by the malicious actor. For example, in some embodiments, the predetermined endpoint 212 may be established using one or more cloud instances or other endpoints associated with the subject system 106.

At 412, in some embodiments, the detection script may send the request 208 as one or more DNS requests that include the obfuscated data payload 210. For example, the detection script may divide the obfuscated data payload 210 into multiple segments, and may send a DNS request for each segment to a domain associated with the subject system 106. Each segment of the obfuscated data payload 210 may be included, for example, as a host name, a sub-domain, or other part of the DNS request. Each of the DNS requests included in a request 208 may also include a unique identifier, a sequential counter, and/or other data that may allow the endpoint 212 to identify and reconstruct the request 208 from the multiple DNS requests. These DNS requests may not be visible using typical web developer tools provided by a web browser of the device 108, and thus may not be detected by the malicious actor. Additionally, although lower-level network monitoring may detect these DNS requests, the requests may appear to be ordinary DNS requests and thus may not be easily identifiable as notifications from a tracking element. After sending the request 208, the method 400 is completed. The method 400 may be repeated by the device 108, for example in response to loading another web page including an embedded tracking element 204.

Figure 5:
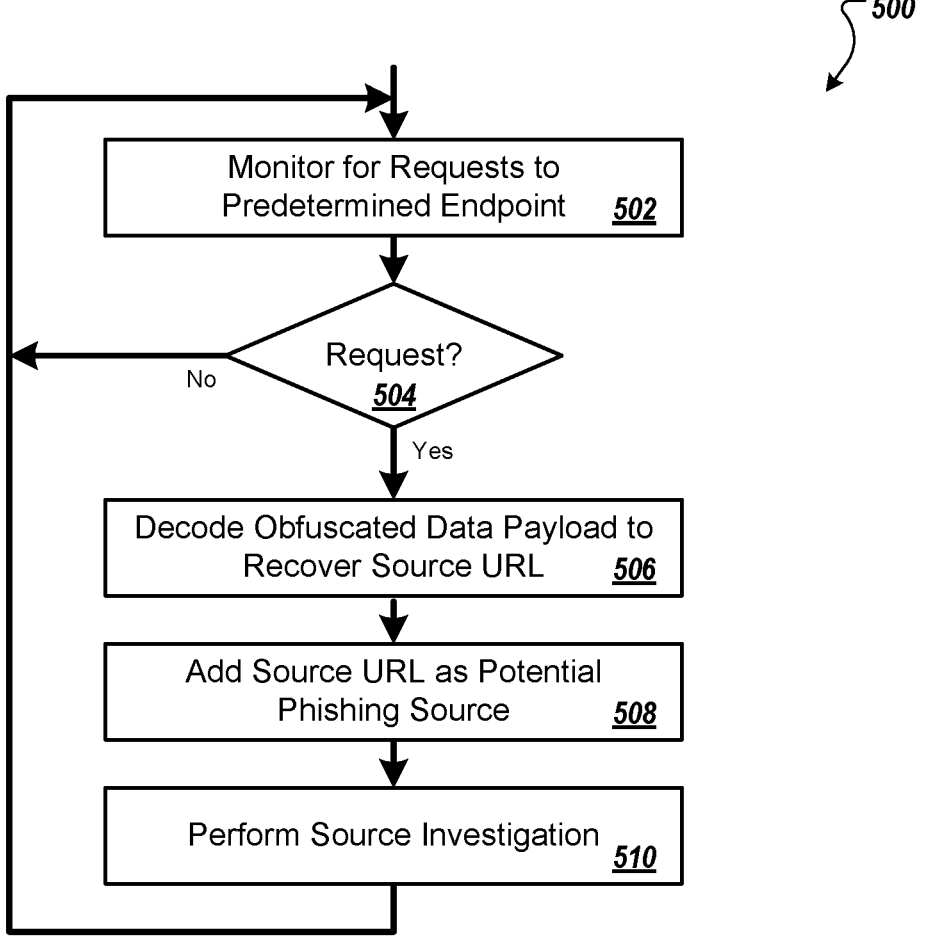
FIG. 5 is a flow diagram of an example technique for discovering potential sources of phishing attempts and performing automated digital investigations.

Referring now to FIG. 5, a flow diagram of an example method 500 is shown for monitoring and analyzing potential phishing web sites. In the present example, the method 500 can be performed by components of the system 100 such as a phishing identification system 102, and will be described with reference to FIG. 1. However, other systems may be used to perform the same or a similar process.

At 502, the phishing identification system 102 monitors the predetermined endpoint 212 for requests 208 received from devices 108. For example, the phishing identification system 102 may determine if one more HTTP requests or other web requests were received by the predetermined endpoint 212. As another example, the phishing identification system 102 may determine if one more DNS requests were received by the predetermined endpoint 212. At 504, the phishing identification system 102 checks whether a request 208 was received at the predetermined endpoint 212. If not, the method 500 loops back to block 502 to continue monitoring for requests 208. If a request 208 is received, the method 500 advances to block 506.

At 506, the phishing identification system 102 decodes the obfuscated data payload 210 to recover the source URL provided by the detection script. The source URL is associated with the web server 146 that provided the web page 206 that included the embedded tracking element, as described above. Based on the encoding scheme used by the detection script as described above, the phishing identification system 102 may base64 decode the obfuscated data payload 210. Additionally or alternatively, the phishing identification system 102 may reassemble the obfuscated data payload 210 from multiple DNS requests or other requests received at the predetermined endpoint 212.

At 508, the phishing identification system 102 adds the source URL as a potential phishing source to the discovered source database 150. At 510, the phishing identification system 102 may perform a source investigation based on the source URL. The source investigation may be automated, semi-automated, and/or manual, and may include determining whether the web site 146 associated with the web site 204 is controlled by a malicious actor. For example, the phishing identification system 102 may distinguish false positive notifications caused, for example, when a user saves a copy of a web page 202 and loads that copy from the user's local storage device. The source investigation may also include mitigating the potential phishing source. After performing source investigation, the method 500 loops back to block 502 to continue monitoring for requests 208 to the predetermined endpoint 212.

Figure 6:
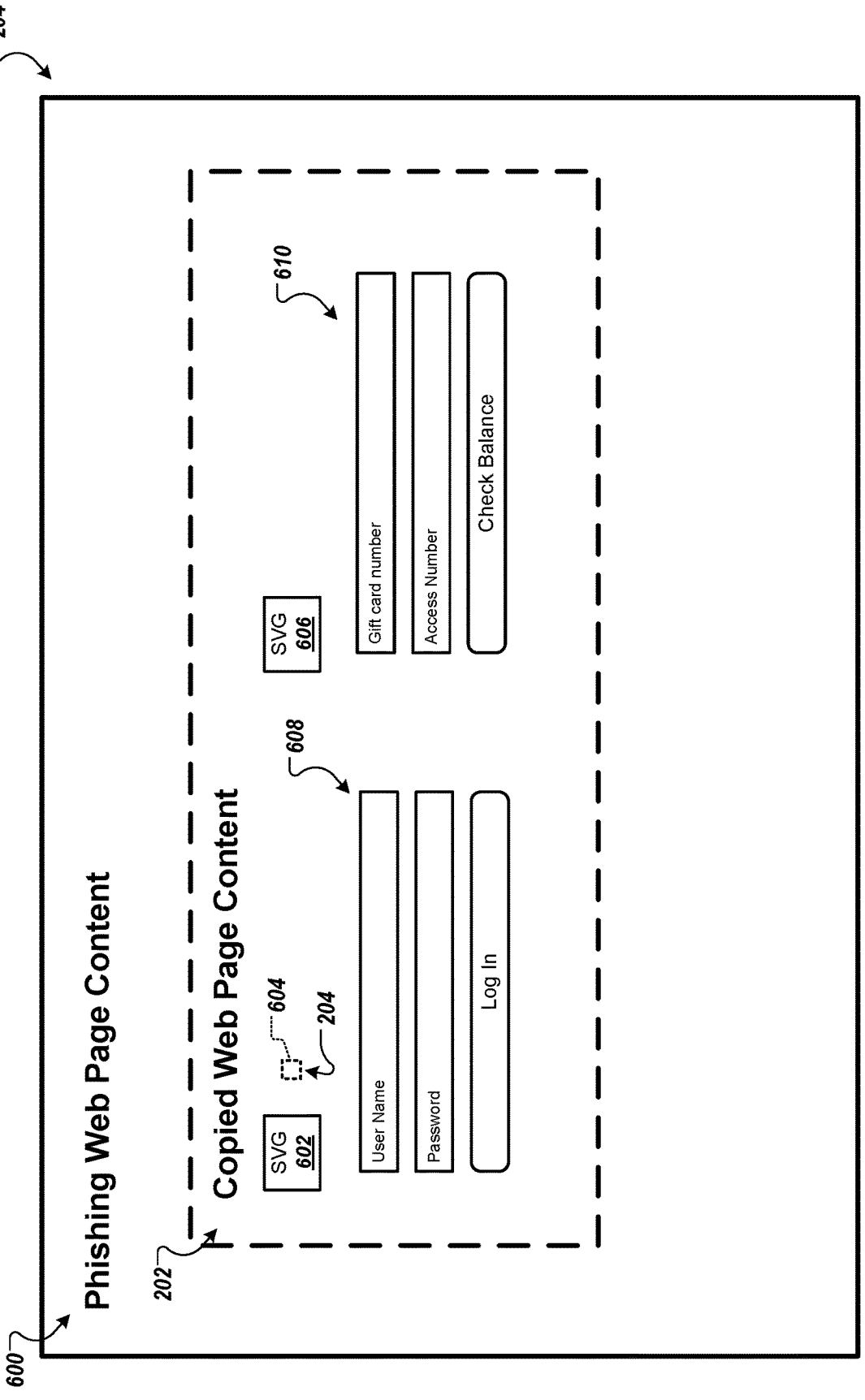
FIG. 6 depicts an example instance of phishing web content including an embedded tracking element.

Referring now to FIG. 6, an example interface 600 is depicted that may be provided by a user device 108. The interface 600 may correspond to the interface of a web browser executed by the user device 108 that is currently displaying a phishing web page 206 served by a web server 146. As shown, the phishing web page 206 includes web page content that has been copied from the legitimate web page 202 served by the subject system 106. Accordingly, the phishing web page 206 (or part of the phishing web page 206) may be visually consistent with the legitimate web page 202.

Elements copied from the legitimate web page illustratively include scalable vector graphics (SVG) image 602, invisible SVG image 604, and SVG image 606. The copied elements may also include controls 608, 610, which may be used by the malicious actor to capture sensitive personal information, financial information, or other sensitive information. For example, the illustrative phishing page 206 includes a user login control 608 that may be used to capture user credentials, and a gift card balance checker control 610 that may be used to capture financial information. As described above, the malicious actor may modify those controls 608, 610 in order to capture the sensitive information provided by the user of the device 108.

The SVG images 602, 606 correspond to the embedded markup images N1, N3 shown in FIG. 2 and may be identifying visual images associated with the web page 202, such as company logos, icons, navigation controls, or other images associated with the look and feel of the web page 202. The invisible SVG image 604 is an embedded tracking element 204 as shown in FIG. 2 (corresponding to tracking element N2). Although not visible in the interface 600, the invisible SVG image 604 is included in source code of the copied web page 202, 206 in proximity to the visible images 602, 606. Accordingly, when copying content from the legitimate web page 202, it is likely that the malicious actor will copy all of the embedded SVG images 602, 604, 606 (including the tracking element 604).

Figure 7:
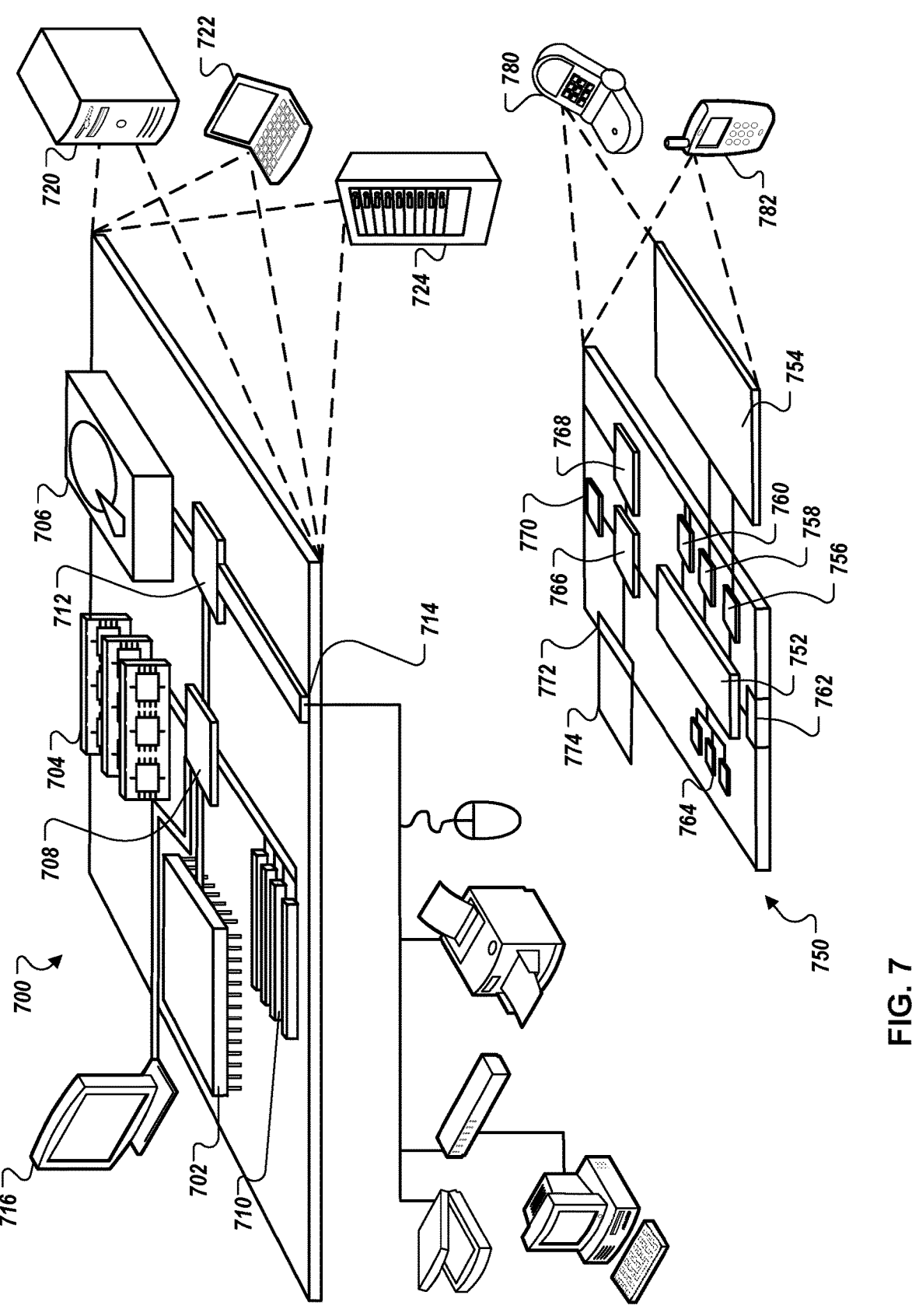
FIG. 7 is a schematic diagram that shows an example of a computing device and a mobile computing device.

FIG. 7 shows an example of a computing device 700 and an example of a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middle-ware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for detecting potential phishing attempts, the method comprising:

serving, by a subject system, a web page comprising (i) an embedded markup image that shares a naming convention with other embedded markup images in the web page, and that is referenced in code of the web page in proximity to the other embedded markup images, and (ii) a first script, wherein the first script is configured to cause a client device to, in response to loading the embedded markup image:

load an obfuscated data attribute, wherein the obfuscated data attribute is stored as an Extensible Markup Language (XML)/Hypertext Markup Language (HTML) attribute of the embedded markup image, and wherein at least one of (i) a name of the obfuscated data attribute or (ii) metadata associated with the obfuscated data attribute is related to a visual presentation element of the webpage;

decode the contents of the obfuscated data attribute to recover a detection script; and execute the detection script that has been recovered by decoding the contents of the data attribute, wherein the detection script is configured to cause the client device to perform operations comprising:

determining a current environment location indicative of a source of the web page;

determining whether the current environment location matches a domain associated with the subject system; and in response to determining that the current environment location does not match the domain associated with the subject system, (i) generating an obfuscated data payload that specifies the current environment location, and (ii) sending, to a predetermined endpoint, at least one request that comprises the obfuscated data payload.

2. The method of claim 1, wherein the embedded markup image comprises a scalable vector graphics image.

3. The method of claim 1, wherein the obfuscated data attribute represents a plurality of numeric values, and wherein to decode the obfuscated data attribute comprises to convert the plurality of numeric values represented by the obfuscated data attribute into a plurality of characters indicative of the detection script.

4. The method of claim 3, wherein to convert the plurality of numeric values comprises to convert the numeric values with an American Standard Code for Information Interchange (ASCII) encoding.

5. The method of claim 1, wherein the current environment location comprises a window location uniform resource locator (URL), and wherein determining whether the current environment location matches the domain associated with the subject system comprises determining whether the window location URL matches a top-level domain associated with the subject system.

6. The method of claim 1, wherein generating the obfuscated data payload comprises generating a base64-encoded string indicative of the current environment location.

7. The method of claim 1, wherein sending the at least one request to the predetermined endpoint comprises sending a hypertext transfer protocol request that comprises the obfuscated data payload to the predetermined endpoint.

8. The method of claim 7, wherein the predetermined endpoint comprises an obfuscated website address.

9. The method of claim 1, wherein sending the at least one request comprises sending one or more Domain Name System (DNS) requests to the predetermined endpoint, wherein the one or more DNS requests comprises the obfuscated data payload.

10. The method of claim 1, further comprising:

receiving, by the predetermined endpoint, the at least one request from the client device;

decoding, by the predetermined endpoint, the obfuscated data payload of the at least one request to recover the current environment location; and adding, by the predetermined endpoint, the current environment location to a database of potential phishing sources.

11. The computer-implemented method of claim 1, wherein the detection script is configured to cause the client device to perform operations further comprising:

dividing the obfuscated data payload into multiple segments; and including each segment of the multiple segments with a respective request, along with a unique identifier and a sequential counter.

12. The computer-implemented method of claim 1, wherein the embedded markup image renders as a visual element of the website.

13. The computer-implemented method of claim 1, wherein the embedded markup image renders as an invisible element of the website.

14. A computer system comprising:

one or more data processing apparatuses including one or more processors, memory, and storage devices storing instructions that, when executed, cause the one or more processors to perform operations comprising:

serving a web page comprising an (i) an embedded markup image that shares a naming convention with other embedded markup images in the web page, and that is referenced in code of the web page in proximity to the other embedded markup images, and (ii) a first script, wherein the first script is configured to cause a client device to, in response to loading the embedded markup image:

load an obfuscated data attribute, wherein the obfuscated data attribute is stored as an Extensible Markup Language (XML)/Hypertext Markup Language (HTML) attribute of the embedded markup image, and wherein at least one of (i) a name of the obfuscated data attribute or (ii) metadata associated with the obfuscated data attribute is related to a visual presentation element of the webpage;

decode the contents of the obfuscated data attribute to recover a detection script; and execute the detection script that has been recovered by decoding the contents of the data attribute, wherein the detection script is configured to cause the client device to perform operations comprising:

determining a current environment location indicative of a source of the web page;

determining whether the current environment location matches a domain associated with the subject system; and in response to determining that the current environment location does not match the domain associated with the subject system, (i) generating an obfuscated data payload that specifies the current environment location, and (ii) sending, to a predetermined endpoint, at least one request that comprises the obfuscated data payload.

15. The computer system of claim 14, wherein the current environment location comprises a window location uniform resource locator (URL), and wherein determining whether the current environment location matches the domain associated with the computer system comprises determining whether the window location URL matches a top-level domain associated with the computer system.

16. The computer system of claim 14, wherein sending the at least one request to the predetermined endpoint comprises sending a hypertext transfer protocol request that comprises the obfuscated data payload to the predetermined endpoint.

17. The computer system of claim 14, wherein sending the at least one request comprises sending one or more Domain Name System (DNS) requests to the predetermined endpoint, wherein the one or more DNS requests comprises the obfuscated data payload.

18. A non-transitory computer-readable storage medium coupled to one or more processors and having instructions stored thereon which, when executed by the one or more processors, cause the one or more processors to perform operations comprising:

serving a web page comprising (i) an embedded markup image that shares a naming convention with other embedded markup images in the web page, and that is referenced in code of the web page in proximity to the other embedded markup images, and (ii) a first script, wherein the first script is configured to cause a client device to, in response to loading the embedded markup image:

load an obfuscated data attribute, wherein the obfuscated data attribute is stored as an Extensible Markup Language (XML)/Hypertext Markup Language (HTML) attribute of the embedded markup image, and wherein at least one of (i) a name of the obfuscated data attribute or (ii) metadata associated with the obfuscated data attribute is related to a visual presentation element of the webpage;

decode the contents of the obfuscated data attribute to recover a detection script; and execute the detection script that has been recovered by decoding the contents of the data attribute, wherein the detection script is configured to cause the client device to perform operations comprising:

determining a current environment location indicative of a source of the web page;

determining whether the current environment location matches a domain associated with the subject system; and in response to determining that the current environment location does not match the domain associated with the subject system, (i) generating an obfuscated data payload that specifies the current environment location, and (ii) sending, to a predetermined endpoint, at least one request that comprises the obfuscated data payload.

19. The non-transitory computer-readable storage medium of claim 18, wherein sending the at least one request to the predetermined endpoint comprises sending a hypertext transfer protocol request that comprises the obfuscated data payload to the predetermined endpoint.

20. The non-transitory computer-readable storage medium of claim 18, wherein sending the at least one request comprises sending one or more Domain Name System (DNS) requests to the predetermined endpoint, wherein the one or more DNS requests comprises the obfuscated data payload.

* * * * *